US009185430B2

(12) United States Patent
An et al.

(10) Patent No.: US 9,185,430 B2
(45) Date of Patent: Nov. 10, 2015

(54) DEBLOCKING FILTERING METHOD AND DEBLOCKING FILTER

(75) Inventors: Jicheng An, Beijing (CN); Yongying Gao, Beijing (CN); Shaw-Min Lei, Hsinchu County (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 797 days.

(21) Appl. No.: 12/981,430

(22) Filed: Dec. 29, 2010

(65) Prior Publication Data
US 2011/0222607 A1 Sep. 15, 2011

Related U.S. Application Data

(60) Provisional application No. 61/313,852, filed on Mar. 15, 2010, provisional application No. 61/368,000, filed on Jul. 27, 2010.

(51) Int. Cl.
H04N 19/86 (2014.01)
H04N 19/159 (2014.01)
H04N 19/176 (2014.01)
H04N 19/102 (2014.01)
H04N 19/117 (2014.01)
H04N 19/186 (2014.01)

(52) U.S. Cl.
CPC ............ *H04N 19/86* (2014.11); *H04N 19/102* (2014.11); *H04N 19/117* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS

| 2003/0053541 | A1* | 3/2003 | Sun et al. | 375/240.16 |
|---|---|---|---|---|
| 2006/0227869 | A1 | 10/2006 | Joch | |
| 2006/0250653 | A1* | 11/2006 | Joch et al. | 358/3.26 |
| 2008/0025632 | A1 | 1/2008 | Bjontegaard | |

FOREIGN PATENT DOCUMENTS

| CN | 1571515 A | 1/2005 |
|---|---|---|
| CN | 1867075 A | 11/2006 |
| CN | 101472175 A | 7/2009 |
| EP | 1 296 522 A2 | 3/2003 |
| EP | 1 864 499 A1 | 12/2007 |
| WO | 2006094035 A1 | 9/2006 |
| WO | 2007033551 A1 | 3/2007 |

OTHER PUBLICATIONS

ITU-T VCEG (Q.6/16), Detailed Algorithm Technical Description for ITU-T VCEG Draft H.26L Algorithm, Jul. 2001, ITU-T VCEG, Study Group 16, pp. 19-21.*
International application No. PCT/CN2011/071806, International filing date: Mar. 15, 2011, International Searching Report mailing date: Jun. 23, 2011.

* cited by examiner

*Primary Examiner* — Geepy Pe
*Assistant Examiner* — William Adrovel
(74) *Attorney, Agent, or Firm* — Winston Hsu; Scott Margo

(57) ABSTRACT

An exemplary deblocking filtering method includes checking if at least one of two adjacent blocks is an intra-coded block and accordingly generating a checking result; and applying a deblocking filtering scheme with a clipping range to the two adjacent blocks by a deblocking filtering circuit as long as the checking result indicates that at least one of the two adjacent blocks is the intra-coded block.

13 Claims, 7 Drawing Sheets

DEBLOCKING FILTERING METHOD AND DEBLOCKING FILTER

CROSS REFERENCE TO RELATED APPLICATIONS

This application claims the benefit of U.S. provisional application No. 61/313,852, filed on Mar. 15, 2010, and U.S. provisional application No. 61/368,000, filed on Jul. 27, 2010. The whole content of the related applications is incorporated herein by reference.

BACKGROUND

The disclosed embodiments of the present invention relate to encoding/decoding image data, and more particularly, to improved/enhanced deblocking filtering methods and related deblocking filter thereof.

Most of the video compression standards adopt block-based transform coding technique to exploit spatial redundancy. For example, the basic approach is to divide the whole image into a plurality of blocks, perform prediction on each block, transform residues of each block using discrete cosine transform, and perform quantization and entropy encoding. However, using the block-based transform coding technique would make the reconstructed image suffer from visually annoying effects known as blocking effects or blocking artifacts. Another source of blocking artifacts in video may be motion compensated prediction. Motion compensated blocks may be generated by copying interpolated pixel data from locations of possibly different reference frames, resulting in discontinuities on edges/boundaries of blocks. One solution to mitigate the undesired blocking artifacts is to use a deblocking filter after the inverse transform in the encoder and the decoder.

The operation of a conventional deblocking filter may be divided into three phases, i.e., filtering strength computation, filtering decision, and filtering implementation. The filtering strength, i.e., the amount of filtering, is computed with the help of a parameter called boundary strength (BS). For example, as specified in the H.264 standard, the boundary strength is assigned an integer value being one of five possible options (e.g., 0, 1, 2, 3, and 4). Specifically, if a boundary of two adjacent blocks to be filtered is a macroblock (MB) boundary and at least one of the two adjacent blocks is an intra-coded block, the highest boundary strength (i.e., BS=4) is assigned and the strongest filter is applied in response to the highest boundary strength. As the strongest filter applied to the boundary of two adjacent blocks has no clipping operation, the distortion of the deblocking filtering output may be significant, leading to degradation of the image quality. Moreover, regarding coding units coded with intra 4×4 and intra 8×8 modes, there are no significant differences between the coding unit edges and intra 4×4 or 8×8 edges. Thus, it is unreasonable to perform deblocking filtering upon coding unit edges and inner edges differently. In other words, the strongest filter selected due to the highest boundary strength (i.e., BS=4) may cause the MB outer block boundaries much smother than MB inner block boundaries, which is not reasonable.

Regarding the filtering decision phase, it does not depend only on the non-zero boundary strength. That is, the deblocking filtering may not be needed, even in the case of the non-zero boundary strength. For example, if the image does have real sharp transitions/edges across the block boundary, applying the deblocking filter to these block boundaries would result in a blurry image. Therefore, threshold values may be used for determining if a block boundary should be filtered using the deblocking filtering and determining whether a stronger filter or a weaker filter should be used to smooth the block boundary which is determined to be filtered. In general, the threshold values are determined by respective look-up tables. However, according to the conventional deblocking filter design, the same look-up tables are referenced no matter whether the two adjacent blocks are both intra-coded blocks, both inter-coded blocks, or a combination of one intra-coded block and one inter-coded block. Such design does lack flexibility and may fail to achieve good image quality.

Regarding the filtering implementation phase, the deblocking filtering may have clipping parameters which are indexed by the boundary strength and the quantization parameter (QP) and accordingly define a clipping range. The image quality can be improved if the clipping parameters are properly set.

Thus, in regard to the design of the deblocking filter employed in the encoder and the decoder, there is still room for improvement.

SUMMARY

In accordance with exemplary embodiments of the present invention, an improved/enhanced deblocking filtering method and related deblocking filter thereof are proposed to solve the above-mentioned problem.

According to a first aspect of the present invention, an exemplary deblocking filtering method includes checking if at least one of two adjacent blocks is an intra-coded block and accordingly generating a checking result; and applying a deblocking filtering scheme with a clipping range to the two adjacent blocks by a deblocking filtering circuit as long as the checking result indicates that at least one of the two adjacent blocks is the intra-coded block.

According to a second aspect of the present invention, an exemplary deblocking filtering method includes: checking if at least one of two adjacent blocks is an intra-coded block and accordingly generating a checking result; and utilizing a control circuit to set a boundary strength utilized for determining a filtering strength of a deblocking filtering scheme according to the checking result, wherein a specific value is assigned to the boundary strength as long as the checking result indicates that at least one of the two adjacent blocks is the intra-coded block.

According to a third aspect of the present invention, an exemplary deblocking filtering method includes: when two adjacent blocks are both inter-coded blocks, utilizing a control circuit for determining whether to filter a boundary between the inter-coded blocks by referring to a first threshold setting; and when at least one of the two adjacent blocks is an intra-coded block, utilizing the control circuit for determining whether to filter a boundary between the two adjacent blocks including at least one intra-coded block by referring to a second threshold setting, wherein the second threshold setting is different from the first threshold setting.

According to a fourth aspect of the present invention, an exemplary deblocking filtering method includes: when two adjacent blocks are both inter-coded blocks and a boundary between the inter-coded blocks is determined to be filtered, utilizing a control circuit for determining which deblocking filtering scheme is to be applied to the boundary between the inter-coded blocks by referring to a first threshold setting; and when at least one of the two adjacent blocks is an intra-coded block and a boundary between the two adjacent blocks including at least one intra-coded block is determined to be filtered, utilizing the control circuit for determining which deblocking filtering scheme is to be applied to the boundary between the two adjacent blocks including at least one intra-coded block by referring to a second threshold setting, wherein the second threshold setting is different from the first threshold setting.

According to a fifth aspect of the present invention, an exemplary deblocking filtering method includes: when two adjacent blocks are both inter-coded blocks, applying a first deblocking filtering scheme with a predetermined clipping range to a pixel value of a first sample in one of the two adjacent blocks and a pixel value of a second sample in the other of the two adjacent blocks by a deblocking filtering circuit; and when at least one of the two adjacent blocks is an intra-coded block, applying a second deblocking filtering scheme with the specific clipping range to the first sample and the second sample by the deblocking filtering circuit.

According to a sixth aspect of the present invention, an exemplary deblocking filtering method includes: applying a deblocking filtering scheme with a predetermined clipping range to a pixel value of a first sample in one of two adjacent blocks and a pixel value of a second sample in the other of the two adjacent blocks by a deblocking filtering circuit; and applying the deblocking filtering scheme with the predetermined clipping range to a pixel value of a third sample in the one of the two adjacent blocks and a pixel value of a fourth sample in the other of the two adjacent blocks by the deblocking filtering circuit.

According to a seventh aspect of the present invention, an exemplary deblocking filter includes a deblocking filtering circuit and a control circuit. The control circuit is coupled to the deblocking filtering circuit, and implemented for checking if at least one of two adjacent blocks is an intra-coded block and accordingly generating a checking result, and controlling the deblocking filtering circuit to apply a deblocking filtering scheme with a clipping range to the two adjacent blocks as long as the checking result indicates that at least one of the two adjacent blocks is the intra-coded block.

According to an eighth aspect of the present invention, an exemplary deblocking filter includes a deblocking filtering circuit and a control circuit. The control circuit is coupled to the deblocking filtering circuit, and implemented for checking if at least one of two adjacent blocks is an intra-coded block and accordingly generating a checking result, and setting a boundary strength utilized for determining a filtering strength of a deblocking filtering scheme employed by the deblocking filtering circuit according to the checking result, wherein a specific value is assigned to the boundary strength as long as the checking result indicates that at least one of the two adjacent blocks is the intra-coded block.

According to a ninth aspect of the present invention, an exemplary deblocking filter includes a deblocking filtering circuit and a control circuit. The control circuit is coupled to the deblocking filtering circuit, and implemented for checking two adjacent blocks and accordingly generating a checking result, wherein when the checking result indicates that the two adjacent blocks are both inter-coded blocks, the control circuit utilizes a first threshold setting to determine whether to control the deblocking filtering circuit to filter a boundary between the inter-coded blocks, and when the checking result indicates that at least one of the two adjacent blocks is the intra-coded block, the control circuit utilizes a second threshold setting to determine whether to control the deblocking filtering circuit to filter a boundary between the two adjacent blocks including at least one intra-coded block, wherein the second threshold setting is different from the first threshold setting.

According to a tenth aspect of the present invention, an exemplary deblocking filter includes a deblocking filtering circuit and a control circuit. The control circuit is coupled to the a deblocking filtering circuit, and implemented for checking two adjacent blocks and accordingly generating a checking result, wherein when the checking result indicates that the two adjacent blocks are both inter-coded blocks and a boundary between the inter-coded blocks is determined to be filtered, the control circuit utilizes a first threshold setting to determine which deblocking filtering scheme is to be applied to the boundary between the inter-coded blocks that is to be filtered by the deblocking filtering circuit, and when the checking result indicates that at least one of the two adjacent blocks is an intra-coded block and a boundary between the two adjacent blocks including at least one intra-coded block is determined to be filtered, the control circuit utilizes a second threshold setting to determine which deblocking filtering scheme is to be applied to the boundary between the two adjacent blocks including at least one intra-coded block that is to be filtered by the deblocking filtering circuit, wherein the second threshold setting is different from the first threshold setting.

According to an eleventh aspect of the present invention, an exemplary deblocking filter includes a deblocking filtering circuit and a control circuit. The control circuit is coupled to the deblocking filtering circuit, and implemented for checking two adjacent blocks and accordingly generating a checking result, wherein when the checking result indicates that the two adjacent blocks are both inter-coded blocks, the control circuit controls the deblocking filtering circuit to apply a first deblocking filtering scheme with a predetermined clipping range to a pixel value of a first sample in one of the two adjacent blocks and a pixel value of a second sample in the other of the two adjacent blocks; and when the checking result indicates that at least one of the two adjacent blocks is an intra-coded block, the control circuit controls the deblocking filtering circuit to apply a second deblocking filtering scheme with the specific clipping range to the first sample and the second sample.

According to a twelfth aspect of the present invention, an exemplary deblocking filter includes a deblocking filtering circuit and a control circuit. The control circuit is coupled to the deblocking filtering circuit, and implemented for controlling the deblocking filtering circuit to apply a deblocking filtering scheme with a predetermined clipping range to a pixel value of a first sample in one of two adjacent blocks and a pixel value of a second sample in the other of the two adjacent blocks; and controlling the deblocking filtering circuit to apply the deblocking filtering scheme with the predetermined clipping range to a pixel value of a third sample in the one of the two adjacent blocks and a pixel value of a fourth sample in the other of the two adjacent blocks.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
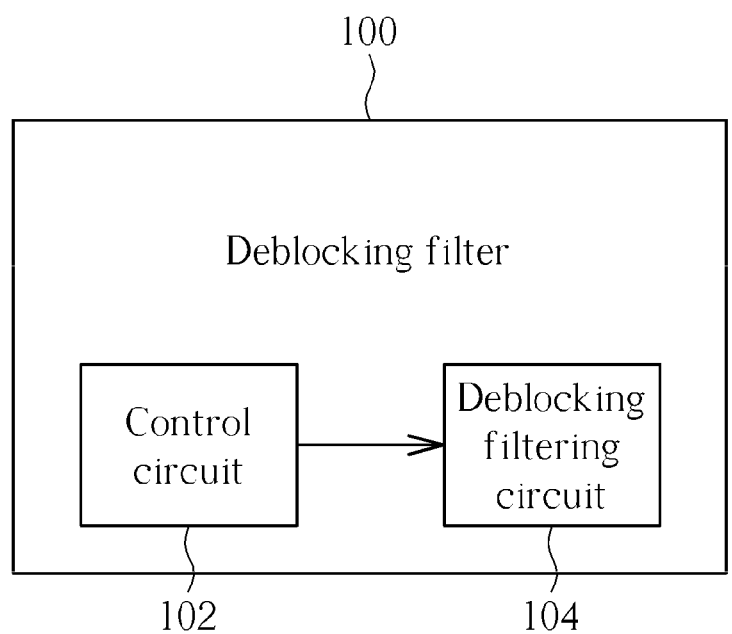
FIG. 1 is a block diagram illustrating a generalized structure of a deblocking filter according to the present invention.

FIG. 1 is a block diagram illustrating a generalized structure of a deblocking filter according to the present invention. The deblocking filter 100 includes, but is not limited to, a control circuit 102 and a deblocking filtering circuit 104 coupled to and controlled by the control circuit 102. As mentioned above, the operation of a deblocking filter may be divided into three phases including filtering strength computation, filtering decision, and filtering implementation. Thus, regarding the proposed exemplary deblocking filter 100 of the present invention, the control circuit 102 is arranged to deal with the filtering strength computation and filtering decision for determining whether the deblocking filtering is needed and how the deblocking filtering is performed when the deblocking filtering is needed for reducing the deblocking artifacts, and is also arranged to control the deblocking filtering circuit 104 operating under the filtering implementation phase. Function and operation of the improved/enhanced deblocking filter is detailed as follows.

Regarding the improvement of the filtering strength computation, the present invention proposes a new design of the boundary strength assignment by removing the highest boundary strength (e.g., BS=4) and its corresponding deblocking filtering scheme. Therefore, the boundary strength is set by a specific value (e.g., 3) as long as at least one of two adjacent blocks is an intra-coded block. Therefore, when at least one of two adjacent blocks is an intra-coded block, the boundary strength is set by the specific value (e.g., 3) no matter whether a boundary of the two adjacent blocks is a macroblock boundary. More specifically, in a case where the boundary of the two adjacent blocks is the macroblock boundary and at least one of the two adjacent blocks is the intra-coded block, the boundary strength is set by the specific value (e.g., 3), and in another case where the boundary of the two adjacent blocks is not the macroblock boundary and at least one of the two adjacent blocks is the intra-coded block, the boundary strength is set by the same specific value (e.g., 3). When the boundary strength is set by the specific value (e.g., 3), a deblocking filtering scheme with a clipping range would be applied to the two adjacent blocks, thereby solving the problem encountered by the conventional deblocking filter design. The new design of the boundary strength assignment ensures that a clipping range is always applied in deblocking filtering scheme, which prevents the significant distortion caused by applying a strong filter without a clipping operation. In another embodiment of the boundary strength assignment and filtering strength computation method, the highest boundary strength (e.g., BS=4) is still allowed for a macroblock boundary and at least one of the two blocks is the intra-coded block, but a clipping range is applied to limit the pixel variation before and after the deblocking operation.

Figure 2:
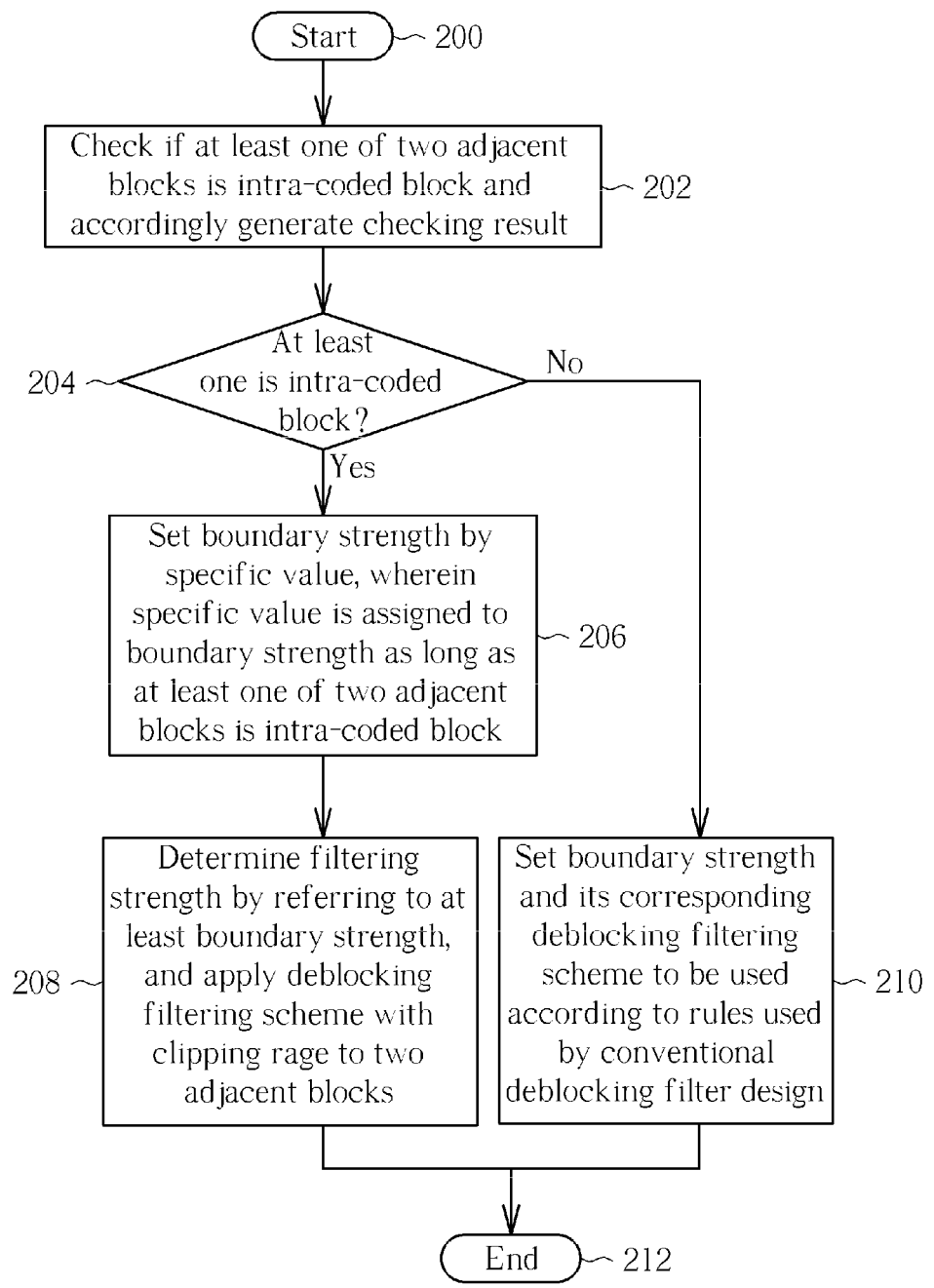
FIG. 2 is a flowchart illustrating a deblocking filtering method according to a first exemplary embodiment of the present invention.

Please refer to FIG. 2, which is a flowchart illustrating a deblocking filtering method according to a first exemplary embodiment of the present invention. Provided that the result is substantially the same, the steps are not required to be executed in the exact order shown in FIG. 2. The exemplary deblocking filtering method is employed by the deblocking filter 100 shown in FIG. 1, and may be briefly summarized as follows.

Step 200: Start.

Step 202: The control circuit 102 checks if at least one of two adjacent blocks is an intra-coded block and accordingly generates a checking result.

Step 204: Does the checking result indicate that at least one of the two adjacent blocks is the intra-coded block? If yes, go to step 206; otherwise, go to step 210.

Step 206: The control circuit 102 sets a boundary strength by a specific value (e.g., BS=3), wherein the specific value is assigned to the boundary strength as long as the checking result indicates that at least one of the two adjacent blocks is the intra-coded block.

Step 208: The control circuit 102 determines a filtering strength by referring to at least the boundary strength set in step 206, and controls the deblocking filtering circuit 104 to apply a deblocking filtering scheme with a clipping range to the two adjacent blocks, wherein the employed deblocking filtering scheme corresponds to the filtering strength which is determined by at least the boundary strength. Go to step 212.

Step 210: The control circuit 102 sets the boundary strength and the corresponding deblocking filtering scheme to be used according to rules referred to by the conventional deblocking filter design.

Step 212: End.

As a person skilled in the art can readily understand operation of each step shown in FIG. 2 after reading above paragraphs, further description is omitted here for brevity.

Figure 3:
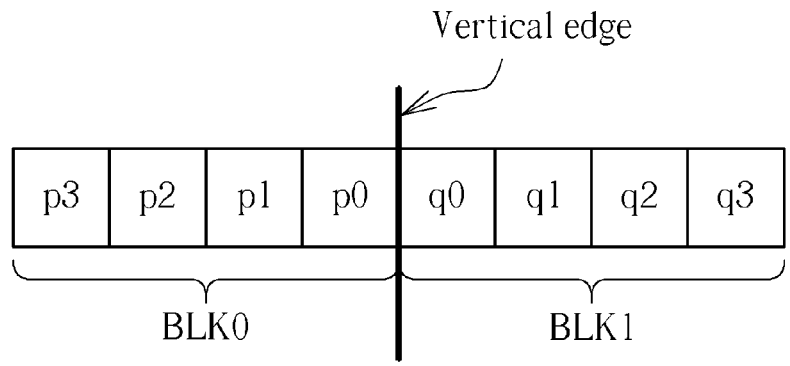
FIG. 3 is a diagram illustrating four samples on either side of a vertical edge.
Figure 4:
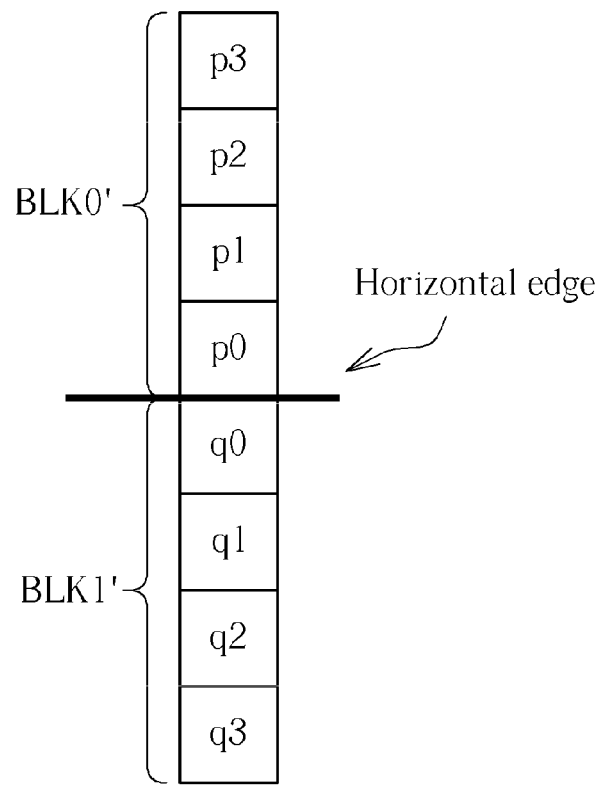
FIG. 4 is a diagram illustrating four samples on either side of a horizontal edge.

Regarding improvement of the filtering decision phase following the filtering strength computation phase, the present invention proposes adjusting threshold values for intra edges. That is, under the same index value setting, the threshold setting selected for determining whether an inter edge (e.g., a boundary between two inter-coded blocks) is different from the threshold setting selected for determining whether an intra edge (e.g., a boundary between two adjacent blocks including at least one intra-coded block). In general, the deblocking filtering operation affects a plurality of samples (luminance samples or chrominance samples) on either side of the block boundary. Four samples p0-p3/q0-q3 on either side of a vertical edge, either an intra edge or an inter edge, is shown in FIG. 3, and four samples p0-p3/q0-q3 on either side of a horizontal edge, either an intra edge or an inter edge, is shown in FIG. 4. The samples p0-p3 are located at one block BLK0/BLK0', and the samples q0-q3 are located at another block BLK1/BLK1' adjacent to the block BLK0/BLK0'. When the boundary strength for the two adjacent blocks BLK0/BLK0' and BLK1/BLK1' is greater than zero, implying that deblocking filtering may be needed, the control circuit 102 would check the threshold setting to determine whether to control the deblocking filtering circuit 104 to actually perform deblocking filtering upon a boundary between two adjacent blocks BLK0/BLK0' and BLK1/BLK1'.

In this exemplary embodiment, the control circuit 102 checks two adjacent blocks (e.g., blocks BLK0 and BLK1 disposed horizontally, or blocks BLK0' and BLK1' disposed vertically) and accordingly generates a checking result. When the checking result indicates that the two adjacent blocks are both inter-coded blocks, the control circuit 102 utilizes a first threshold setting to determine whether to control the deblocking filtering circuit 104 to filter a boundary between the inter-coded blocks. When the checking result indicates that at least one of the two adjacent blocks is the intra-coded block, the control circuit 102 utilizes a second threshold setting to determine whether to control the deblocking filtering circuit 104 to filter a boundary between the two adjacent blocks including at least one intra-coded block.

Please note that the second threshold setting is different from the first threshold setting. For example, the first threshold setting includes a first threshold value $\alpha(Index_A)$ and a second threshold value $\beta(Index_B)$, and the second threshold setting includes a third threshold value $\alpha_1(Index_{A1})$ and a fourth threshold value $\beta_1(Index_{B1})$. The first threshold value $\alpha(Index_A)$ is selected from a plurality of candidate first threshold values according to a first index value $Index_A$, the second threshold value $\beta(Index_B)$ is selected from a plurality of candidate second threshold values according to a second index value $Index_B$, the third threshold value $\alpha_1(Index_{A1})$ is selected from a plurality of candidate third threshold values according to a third index value $Index_{A1}$, and the fourth threshold value $\beta_1(Index_{B1})$ is selected from a plurality of candidate fourth threshold values according to a fourth index value $Index_{B1}$. By way of example, but not limitation, look-up tables may be employed for recording the mapping between candidate threshold values and corresponding index values. Thus, when a target index value is determined, a target threshold value mapped to the target index value can be easily obtained from a pre-built look-up table.

Figure 5:
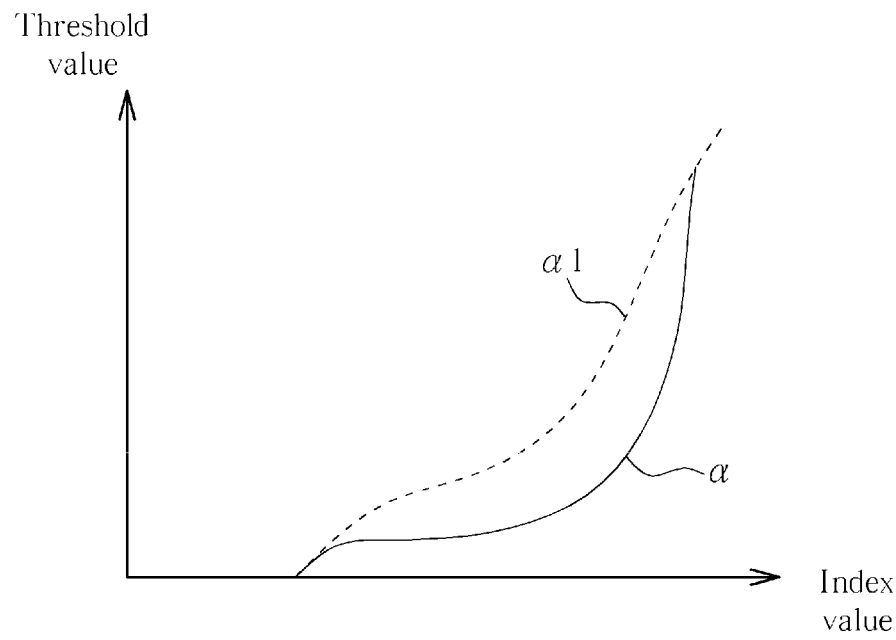
FIG. 5 is a diagram illustrating a first threshold value α as a function of index values and a third threshold value $\alpha_1$ as a function of index values.
Figure 6:
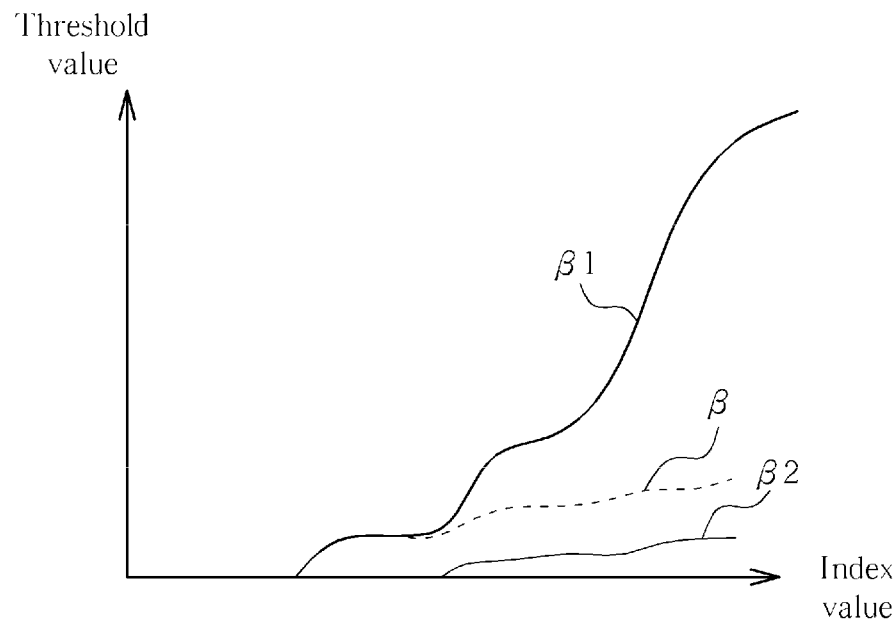
FIG. 6 is a diagram illustrating a second threshold value β as a function of index values, a fourth threshold value $\beta_1$ as a function of index values, and a fifth threshold value $\beta_2$ as a function of index values.

In one exemplary implementation of the present invention, the third threshold value $\alpha_1(Index_{A1})$ is not smaller than the first threshold value $\alpha(Index_A)$ when the first index value $Index_A$ is equal to the third index value $Index_{A1}$, as shown in FIG. 5 which is a diagram illustrating the first threshold value $\alpha$ as a function of index values (e.g., QPs) and the third threshold value $\alpha_1$ as a function of index values (e.g., QPs). In addition, the fourth threshold value $\beta_1(Index_{B1})$ is not smaller than the second threshold value $\beta(Index_B)$ when the second index value $Index_B$ is equal to the fourth index value $Index_{B1}$, as shown in FIG. 6 which is a diagram illustrating at least the second threshold value $\beta$ as a function of index values (e.g., QPs) and the fourth threshold value $\beta_1$ as a function of index values (e.g., QPs).

When two adjacent blocks are both inter-coded blocks, the control circuit 102 determines whether the deblocking filtering circuit 104 needs to filter the boundary between the inter-coded blocks by comparing a difference between samples p0 and q0 with the first threshold value $\alpha(Index_A)$, comparing a difference between samples p1 and p0 with the second threshold value $\beta(Index_B)$, and comparing a difference between samples q1 and q0 with the second threshold value $\beta(Index_B)$. That is, when all of the following inequalities are satisfied, the control circuit 102 would determine that the boundary between the inter-coded blocks should be filtered.

$$|p0-q0|<\alpha(Index_A) \quad (1)$$

$$|p1-p0|<\beta(Index_B) \quad (2)$$

$$|q1-q0|<\beta(Index_B) \quad (3)$$

When at least one of two adjacent blocks is an intra-coded block, the control circuit 102 determines whether the deblocking filtering circuit 104 needs to filter the boundary between the two adjacent blocks including at least one intra-coded block by comparing a difference between samples p0 and q0 with the third threshold value $\alpha_1(Index_{A1})$, comparing a difference between samples p1 and p0 with the fourth threshold value $\beta_1(Index_{B1})$, and comparing a difference between samples q1 and q0 with the fourth threshold value $\beta_1(Index_{B1})$. That is, when all of the following inequalities are satisfied, the control circuit 102 would determine that the boundary between the two adjacent blocks including at least one intra-coded block should be filtered.

$$|p0-q0|<\alpha_1(Index_{A1}) \quad (4)$$

$$|p1-p0|<\beta_1(Index_{B1}) \quad (5)$$

$$|q1-q0|<\beta_1(Index_{B1}) \quad (6)$$

Moreover, when the boundary between the inter-coded blocks is determined to be filtered, the control circuit 102 may utilize a third threshold setting to determine which deblocking filtering scheme is used (e.g., which one of a stronger filter and a weaker filter should be used). Similarly, when the boundary between the two adjacent blocks including at least one intra-coded block is determined to be filtered, the control circuit 102 may utilize a fourth threshold setting to determine which deblocking filtering scheme is used (e.g., which one of a stronger filter and a weaker filter should be used), wherein the fourth threshold setting is different from the third threshold setting. For example, the third threshold setting includes the above-mentioned second threshold value $\beta(Index_B)$, and the fourth threshold setting includes a fifth threshold value $\beta_2(Index_{B2})$. The fifth threshold value $\beta_2(Index_{B2})$ may be selected from a plurality of candidate fifth threshold values according to a fifth index value $Index_{B2}$. Similarly, a look-up table may be used for recording the mapping between candidate fifth threshold values and corresponding index values. In one exemplary implementation of the present invention, the fifth threshold value $\beta_2(Index_{B2})$ is not greater than the second threshold value $\beta(Index_B)$ when the second index value $Index_B$ is equal to the fifth index value $Index_{B2}$, as shown in FIG. 5 which also illustrates the fifth threshold value $\beta_2$ as a function of index values such as Quantization Parameters (QPs).

When two adjacent blocks are both inter-coded blocks, the control circuit 102 determines which deblocking filtering scheme is to be used by comparing a difference between samples p2 and p0 with the second threshold value $\beta(Index_B)$ and comparing a difference between the samples q2 and q0 with the second threshold value $\beta(Index_B)$. That is, when all of the following inequalities are satisfied, the control circuit 102 may control the deblocking filtering circuit 104 to apply stronger deblocking filtering to the block boundary; otherwise, the control circuit 102 may control the deblocking filtering circuit 104 to apply weaker deblocking filtering to the block boundary.

$$|p2-p0|<\beta(\text{Index}_B) \quad (7)$$

$$|q2-q0|<\beta(\text{Index}_B) \quad (8)$$

When at least one of two adjacent blocks is an intra-coded block, the control circuit 102 determines which deblocking filtering scheme is to be used by comparing a difference between samples p2 and p0 with the fifth threshold value $\beta_2(\text{Index}_{B2})$ and comparing a difference between the samples q2 and q0 with the fifth threshold value $\beta_2(\text{Index}_{B2})$. That is, when all of the following inequalities are satisfied, the control circuit 102 would control the deblocking filtering circuit 104 to apply stronger deblocking filtering to the block boundary; otherwise, the control circuit 102 would control the deblocking filtering circuit 104 to apply weaker deblocking filtering to the block boundary.

$$|p2-p0|<\beta_2(\text{Index}_{B2}) \quad (9)$$

$$|q2-q0|<\beta_2(\text{Index}_{B2}) \quad (10)$$

The aforementioned index value may be set by a quantization parameter (QP) directly, or may be derived from adjusting an original index value (e.g., the quantization parameter). For example, more than two encoder-selectable offset values, such as $\text{Offset}_A$, $\text{Offset}_B$, $\text{Offset}_{A1}$, $\text{Offset}_{B1}$, and $\text{Offset}_{B2}$, on the slice level may be used to adjust the index values more accurately. Each of the index values $\text{Index}_A$, $\text{Index}_B$, $\text{Index}_{A1}$, $\text{Index}_{B1}$, and $\text{Index}_{B2}$ is within a range delimited by a minimum value 0 and a maximum value 51, and may be calculated using following equations.

$$\text{Index}_A = \text{Min}(\text{Max}(0, QP+\text{Offset}_A), 51) \quad (11)$$

$$\text{Index}_B = \text{Min}(\text{Max}(0, QP+\text{Offset}_B), 51) \quad (12)$$

$$\text{Index}_{A1} = \text{Min}(\text{Max}(0, QP+\text{Offset}_{A1}), 51) \quad (13)$$

$$\text{Index}_{B1} = \text{Min}(\text{Max}(0, QP+\text{Offset}_{B1}), 51) \quad (14)$$

$$\text{Index}_{B2} = \text{Min}(\text{Max}(0, QP+\text{Offset}_{B2}), 51) \quad (15)$$

It should be noted that above-mentioned index value adjustment is for illustrative purposes only, and is not meant to be a limitation of the present invention. In an alternative design, the index value may be adjusted using other adjusting algorithm. For example, the index values $\text{Index}_A$, $\text{Index}_B$, $\text{Index}_{A1}$, $\text{Index}_{B1}$, and $\text{Index}_{B2}$ may be individually set by applying respective scaling factors to the QP. This also obeys the spirit of the present invention.

Figure 7:
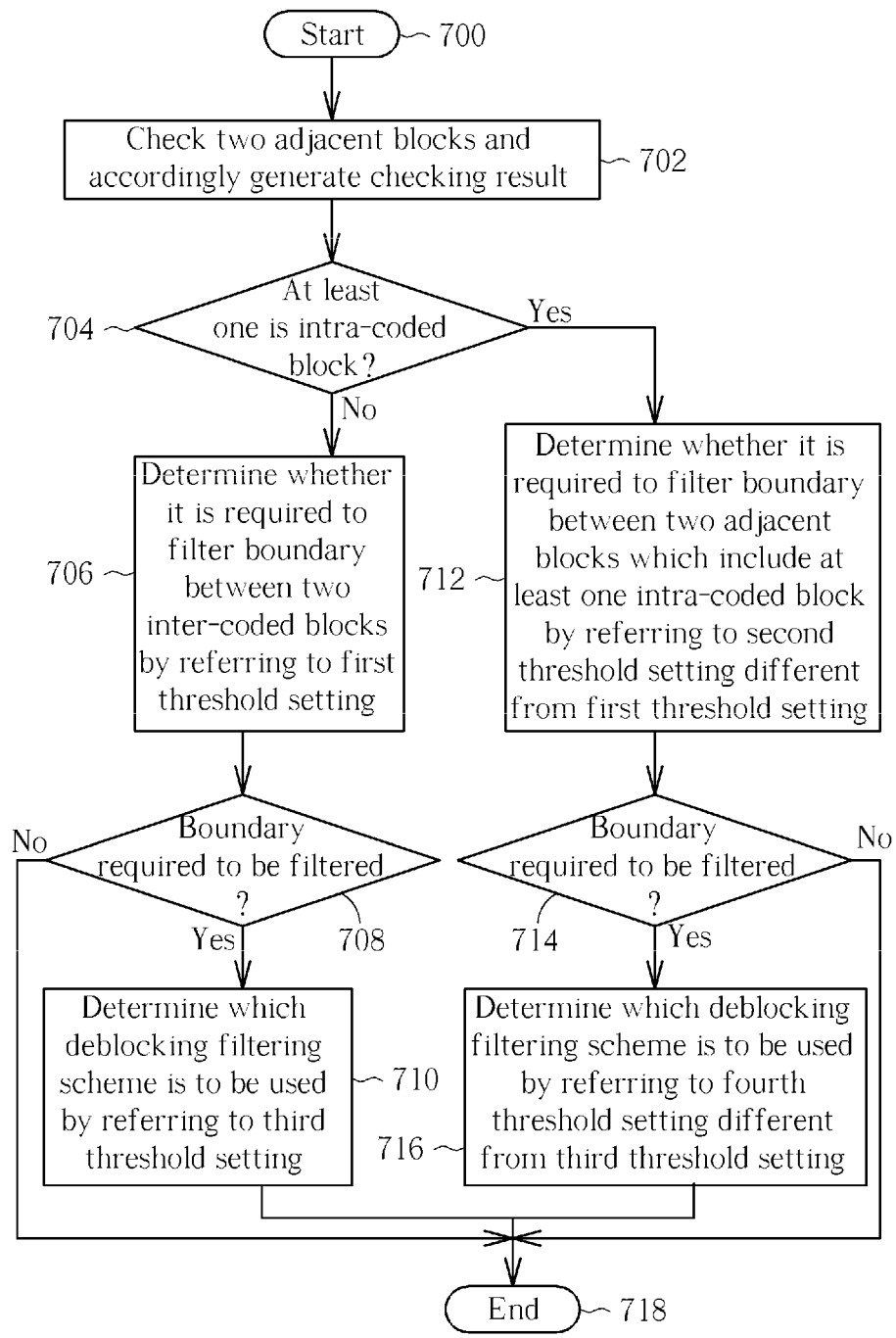
FIG. 7 is a flowchart illustrating a deblocking filtering method according to a second exemplary embodiment of the present invention.

Please refer to FIG. 7, which is a flowchart illustrating a deblocking filtering method according to a second exemplary embodiment of the present invention. Provided that the result is substantially the same, the steps are not required to be executed in the exact order shown in FIG. 7. The exemplary deblocking filtering method is employed by the deblocking filter 100 shown in FIG. 1, and may be briefly summarized as follows.

Step 700: Start.

Step 702: The control circuit 102 checks two adjacent blocks and accordingly generates a checking result.

Step 704: Does the checking result indicate that at least one of the two adjacent blocks is an intra-coded block? If yes, go to step 712; otherwise, go to step 706.

Step 706: The control circuit 102 determines whether the deblocking filtering circuit 104 is required to filter a boundary between the two adjacent blocks which are both inter-coded blocks by referring to a first threshold setting. For example, the first threshold setting may include a first threshold value $\alpha(\text{Index}_A)$ and a second threshold value $\beta(\text{Index}_B)$.

Step 708: Is the boundary between the two adjacent blocks determined to be filtered? If yes, go to step 710; otherwise, go to step 718.

Step 710: The control circuit 102 determines which deblocking filtering scheme is to be used by the deblocking filtering circuit 104 by referring to a third threshold setting. For example, the third threshold setting may include the second threshold value $\beta(\text{Index}_B)$. Go to step 718.

Step 712: The control circuit 102 determines whether the deblocking filtering circuit 104 is required to filter a boundary between the two adjacent blocks which include at least one intra-coded block by referring to a second threshold setting different from the first threshold setting. For example, the second threshold setting may include a third threshold value $\alpha_1(\text{Index}_{A1})$ and a fourth threshold value $\beta_1(\text{Index}_{B1})$.

Step 714: Is the boundary between the two adjacent blocks determined to be filtered? If yes, go to step 716; otherwise, go to step 718.

Step 716: The control circuit 102 determines which deblocking filtering scheme is to be used by the deblocking filtering circuit 104 by referring to a fourth threshold setting different from the third threshold setting. For example, the fourth threshold setting may include a fifth threshold value $\beta_2(\text{Index}_{B2})$.

Step 718: End.

As a person skilled in the art can readily understand operation of each step shown in FIG. 7 after reading above paragraphs, further description is omitted here for brevity. In accordance with the experimental result, the image coding quality can be improved by using a different threshold value setting for intra edges.

Regarding improvement of the filtering implementation phase following the filtering decision phase, the present invention proposes adjusting clipping values (i.e., clipping parameters) which are used to define clipping ranges. In general, the difference between the sample p1/q1 before filtering and the sample p1/q1 after filtering is clipped within the clipping range delimited by a minimum value −c1 and a maximum value c1. Besides, the difference between the sample p0/q0 before filtering and the sample p0/q0 after filtering is clipped within the clipping range delimited by a minimum value −c0 and a maximum value c0. Each of the clipping values c0 and c1 is determined by quantization parameter (QP) and boundary strength (BS). Thus, the clipping values c0 and c1 would become larger when QP and BS are increased. By way of example, but not limitation, a look-up table may be employed for recording the mapping between candidate clipping values and corresponding index values, and a target clipping value c1 indexed by a target index value set by QP and BS may be easily obtained from the pre-built look-up table. Regarding the conventional deblocking filter design, the clipping value c0 is equal to the clipping value c1 plus 1 (i.e., c0=c1+1).

As mentioned above, the exemplary boundary strength assignment design of the present invention removes the highest boundary strength (e.g., BS=4) and its corresponding deblocking filtering scheme. Therefore, the boundary strength is set by a specific value (e.g., 3) as long as at least one of two adjacent blocks is an intra-coded block. Regarding luminance samples of two adjacent blocks, the present invention proposes decreasing the clipping value c1 for BS=3, for example, by replacing the clipping value c1 for BS=3 by the clipping value C1 for BS=2 (i.e., $c1_{(BS=3)} = c1_{(BS=2)}$). In other words, no matter whether the boundary strength is set by 3 or 2, the same clipping value c1 is adopted for defining the clipping range used by the deblocking filtering scheme employed for processing the block boundary. As the clipping value c1 is indexed by QP and BS. Similarly, an index value of the clipping value c1 may be adjusted by applying the encoder-selectable offset value or other adjustment (e.g., a scaling factor) to the quantization parameter.

Figure 8:
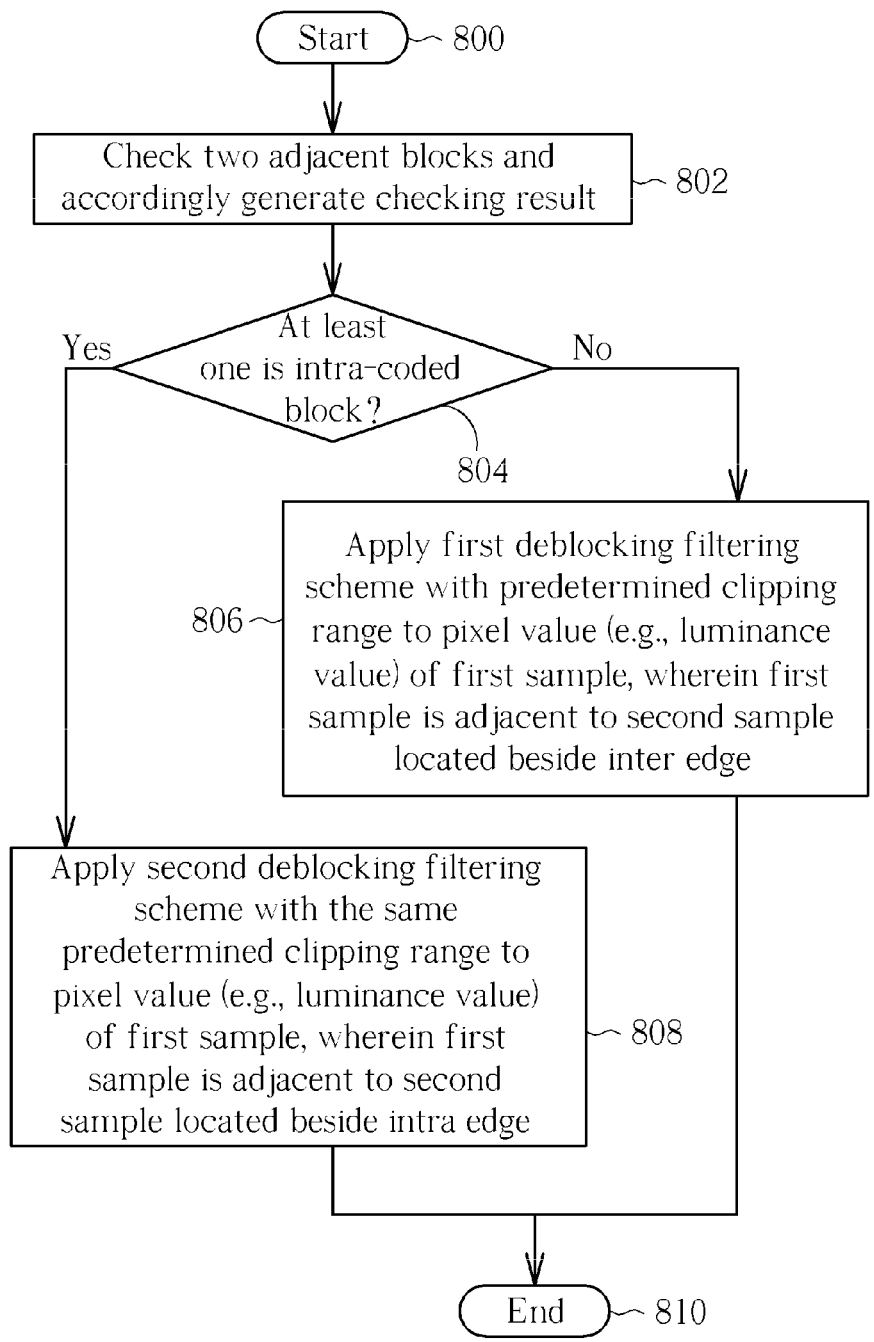
FIG. 8 is a flowchart illustrating a deblocking filtering method according to a third exemplary embodiment of the present invention.

Please refer to FIG. 8, which is a flowchart illustrating a deblocking filtering method according to a third exemplary embodiment of the present invention. Provided that the result is substantially the same, the steps are not required to be executed in the exact order shown in FIG. 8. The exemplary deblocking filtering method is employed by the deblocking filter 100 shown in FIG. 1, and may be briefly summarized as follows.

Step 800: Start.

Step 802: The control circuit 102 checks two adjacent blocks and accordingly generates a checking result.

Step 804: Does the checking result indicate that at least one of the two adjacent blocks is an intra-coded block? If yes, go to step 808; otherwise, go to step 806.

Step 806: The control circuit 102 controls the deblocking filtering circuit 104 to apply a first deblocking filtering scheme with a predetermined clipping range to a pixel value (e.g., a luminance value) of a first sample (e.g., p1 or q1), wherein the first sample is adjacent to a second sample (e.g., p0 or q0) located beside an inter edge (e.g., a boundary between two inter-coded blocks).

Step 808: The control circuit 102 controls the deblocking filtering circuit 104 to apply a second deblocking filtering scheme with the same predetermined clipping range to a pixel value (e.g., a luminance value) of the first sample (e.g., p1 or q1), wherein the first sample is adjacent to a second sample (e.g., p0 or q0) located beside an intra edge (e.g., a boundary between two adjacent blocks including at least one intra-coded block).

Step 810: End.

As a person skilled in the art can readily understand operation of each step shown in FIG. 8 after reading above paragraphs, further description is omitted here for brevity. In accordance with the experimental result, the image quality can be improved by adjusting the clipping value c1 referred to by the deblocking filtering circuit 104 which processes luminance samples under the condition where BS=3.

Regarding chrominance samples of two adjacent blocks, the present invention proposes decreasing the clipping value c0, for example, setting the clipping value c0 for a specific BS and a specific QP by the clipping value c1 for the specific BS and the specific QP. In other words, $c0_{(BS=1,\ QP)} = c1_{(BS=1,\ QP)}$, $c0_{(BS=2,\ QP)} = c1_{(BS=2,\ QP)}$, and $c0_{(BS=3,\ QP)} = c1_{(BS=3,\ QP)}$. In other words, no matter whether the two adjacent blocks include at least one intra-coded block or include inter-coded blocks only, the clipping value c0 is directly set by the clipping value c1 which is determined by QP and BS. Thus, the clipping value c0 may be adjusted as the clipping value c1 or it may be adjusted by applying the encoder-selectable offset value or other adjustment (e.g., a scaling factor) to the quantization parameter (i.e., the index value of the clipping value c1).

Figure 9:
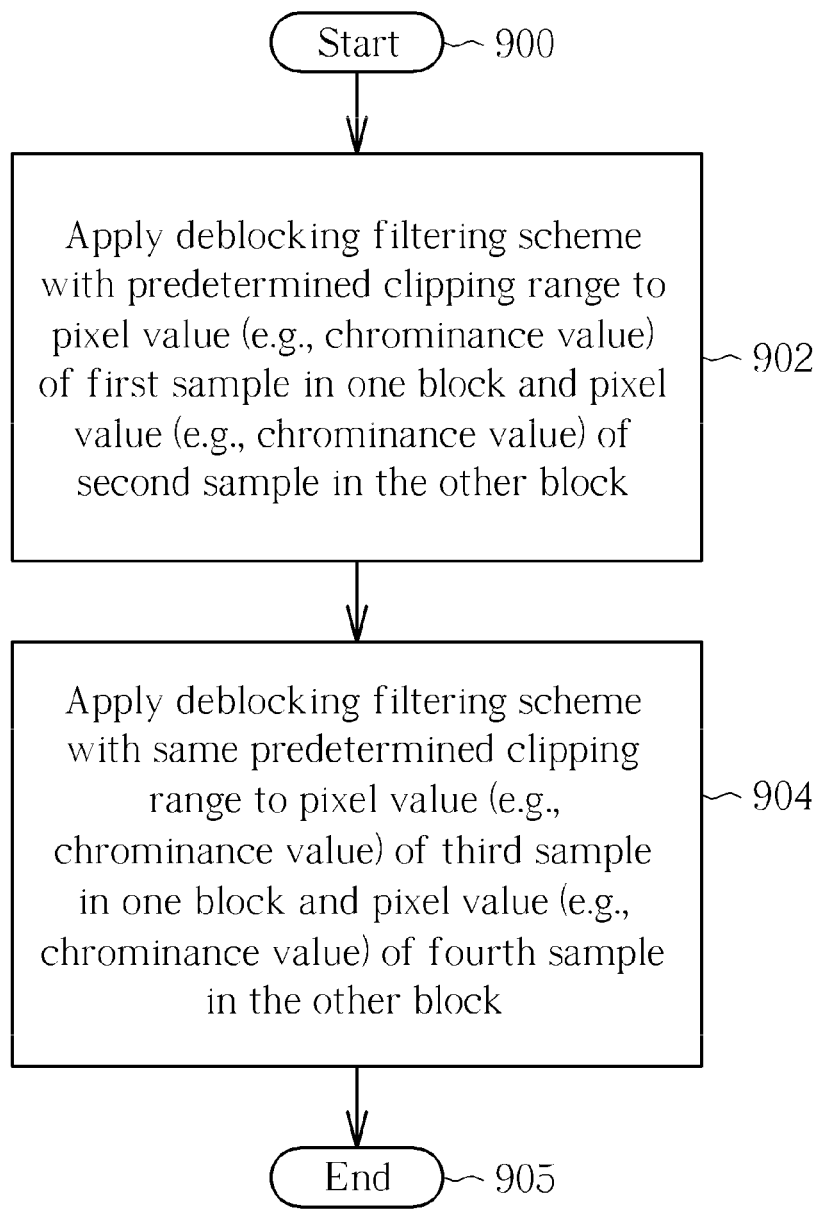
FIG. 9 is a flowchart illustrating a deblocking filtering method according to a fourth exemplary embodiment of the present invention.

Please refer to FIG. 9, which is a flowchart illustrating a deblocking filtering method according to a fourth exemplary embodiment of the present invention. Provided that the result is substantially the same, the steps are not required to be executed in the exact order shown in FIG. 9. The exemplary deblocking filtering method is employed by the deblocking filter 100 shown in FIG. 1, and may be briefly summarized as follows.

Step 900: Start.

Step 902: The control circuit 102 controls the deblocking filtering circuit 104 to apply a deblocking filtering scheme with a predetermined clipping range to a pixel value (e.g., a chrominance value) of a first sample in one of two adjacent blocks and a pixel value (e.g., a chrominance value) of a second sample in the other of the two adjacent blocks, wherein the first sample (e.g., p0) is adjacent to the second sample (e.g., q0) and the first sample is on one side and the second sample is on the other side of an edge (e.g. intra or inter edge).

Step 904: The control circuit 102 controls the deblocking filtering circuit 104 to apply the deblocking filtering scheme with the same predetermined clipping range to a pixel value (e.g., a chrominance value) of a third sample in the one of the two adjacent blocks and a pixel value (e.g., a chrominance value) of a fourth sample in the other of the two adjacent blocks, wherein the third sample (e.g. p1) is adjacent to the first sample, and the fourth sample (e.g. q1) is adjacent to the second sample.

Step 905: End.

As a person skilled in the art can readily understand operation of each step shown in FIG. 9 after reading above paragraphs, further description is omitted here for brevity. In accordance with the experimental result, the image coding quality can be improved by assigning the clipping value c0 to a lower clipping value such as assigning the clipping value c0 to be the same as the clipping value c1 referred to by the deblocking filtering circuit 104 for processing chrominance samples.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A deblocking filtering method, comprising:
    checking if at least one of two adjacent blocks is an intra-coded block and accordingly generating a checking result;
    applying a deblocking filtering scheme with a clipping range to the two adjacent blocks by a deblocking filtering circuit as long as the checking result indicates that at least one of the two adjacent blocks is the intra-coded block;
    when two adjacent blocks are both inter-coded blocks, utilizing a control circuit for determining whether to filter a boundary between the inter-coded blocks by referring to a first threshold setting; and
    when at least one of the two adjacent blocks is an intra-coded block, utilizing the control circuit for determining whether to filter a boundary between the two adjacent blocks including at least one intra-coded block by referring to a second threshold setting different from the first threshold setting;
    wherein one of the two adjacent blocks includes a first sample and a second sample adjacent to the first sample, and the other of the two adjacent blocks includes a third sample adjacent to the first sample and a fourth sample adjacent to the third sample;
    determining whether to filter the boundary between the inter-coded blocks comprises:
    selecting a first threshold value from a plurality of candidate first threshold values according to a first index value;

selecting a second threshold value from a plurality of candidate second threshold values according to a second index value; and determining whether to filter the boundary between the inter-coded blocks by comparing a difference between the first and third samples with the first threshold value, comparing a difference between the second and first samples with the second threshold value, and comparing a difference between the fourth and third samples with the second threshold value; and determining whether to filter the boundary between the two adjacent blocks including at least one intra-coded block comprises:

selecting a third threshold value from a plurality of candidate third threshold values according to a third index value;

selecting a fourth threshold value from a plurality of candidate fourth threshold values according to a fourth index value; and determining whether to filter the boundary between the two adjacent blocks including at least one intra-coded block by comparing a difference between the first and third samples with the third threshold value, comparing a difference between the second and first samples with the fourth threshold value, and comparing a difference between the fourth and third samples with the fourth threshold value.

2. The deblocking filtering method of claim 1, wherein applying the deblocking filtering scheme with the clipping range to the two adjacent blocks comprises:

setting a boundary strength according to the checking result, wherein a specific value is assigned to the boundary strength as long as the checking result indicates that at least one of the two adjacent blocks is the intra-coded block; and applying the deblocking filtering scheme corresponding to a filtering strength determined by at least the boundary strength to the two adjacent blocks.

3. The deblocking filtering method of claim 2, wherein the specific value is equal to 3.

4. A deblocking filtering method, comprising:

when two adjacent blocks are both inter-coded blocks, utilizing a control circuit for determining whether to filter a boundary between the inter-coded blocks by referring to a first threshold setting; and when at least one of the two adjacent blocks is an intra-coded block, utilizing the control circuit for determining whether to filter a boundary between the two adjacent blocks including at least one intra-coded block by referring to a second threshold setting different from the first threshold setting;

wherein one of the two adjacent blocks includes a first sample and a second sample adjacent to the first sample, and the other of the two adjacent blocks includes a third sample adjacent to the first sample and a fourth sample adjacent to the third sample;

determining whether to filter the boundary between the inter-coded blocks comprises:

selecting a first threshold value from a plurality of candidate first threshold values according to a first index value;

selecting a second threshold value from a plurality of candidate second threshold values according to a second index value; and determining whether to filter the boundary between the inter-coded blocks by comparing a difference between the first and third samples with the first threshold value, comparing a difference between the second and first samples with the second threshold value, and comparing a difference between the fourth and third samples with the second threshold value; and determining whether to filter the boundary between the two adjacent blocks including at least one intra-coded block comprises:

selecting a third threshold value from a plurality of candidate third threshold values according to a third index value;

selecting a fourth threshold value from a plurality of candidate fourth threshold values according to a fourth index value; and determining whether to filter the boundary between the two adjacent blocks including at least one intra-coded block by comparing a difference between the first and third samples with the third threshold value, comparing a difference between the second and first samples with the fourth threshold value, and comparing a difference between the fourth and third samples with the fourth threshold value.

5. The deblocking filtering method of claim 4, wherein the third threshold value is not smaller than the first threshold value when the first index value is equal to the third index value, and the fourth threshold value is not smaller than the second threshold value when the second index value is equal to the fourth index value.

6. The deblocking filtering method of claim 4, further comprising:

when the boundary between the inter-coded blocks is determined to be filtered, utilizing a third threshold setting to determine which deblocking filtering scheme is to be used; and when the boundary between the two adjacent blocks including at least one intra-coded block is determined to be filtered, utilizing a fourth threshold setting to determine which deblocking filtering scheme is to be used, wherein the fourth threshold setting is different from the third threshold setting.

7. The deblocking filtering method of claim 6, wherein the one of the two adjacent blocks further includes a fifth sample adjacent to the second sample, and the other of the two adjacent blocks further includes a sixth sample adjacent to the fourth sample; the third threshold setting includes the second threshold value; utilizing the third threshold setting to determine which deblocking filtering scheme is to be used comprises:

determining which deblocking filtering scheme is to be used by comparing a difference between the fifth and first samples with the second threshold value and comparing a difference between the sixth and third samples with the second threshold value; and utilizing the fourth threshold setting to determine which deblocking filtering scheme is to be used comprises:

selecting a fifth threshold value from a plurality of candidate fifth threshold values according to a fifth index value; and determining which deblocking filtering scheme is to be used by comparing a difference between the fifth and first samples with the fifth threshold value and comparing a difference between the sixth and third samples with the fifth threshold value.

8. The deblocking filtering method of claim 7, wherein the fifth threshold value is not greater than the second threshold value when the second index value is equal to the fifth index value.

9. A deblocking filtering method, comprising:
when two adjacent blocks are both inter-coded blocks and a boundary between the inter-coded blocks is determined to be filtered, utilizing a control circuit for determining which deblocking filtering scheme is to be applied to the boundary between the inter-coded blocks by referring to a first threshold setting; and
when at least one of the two adjacent blocks is an intra-coded block and a boundary between the two adjacent blocks including at least one intra-coded block is determined to be filtered, utilizing the control circuit for determining which deblocking filtering scheme is to be applied to the boundary between the two adjacent blocks including at least one intra-coded block by referring to a second threshold setting, wherein the second threshold setting is different from the first threshold setting;
wherein one of the two adjacent blocks includes a first sample, a second sample adjacent to the first sample, and a third sample adjacent to the second sample, and the other of the two adjacent blocks includes a fourth sample adjacent to the first sample, a fifth sample adjacent to the fourth sample, and a sixth sample adjacent to the fifth sample;
determining which deblocking filtering scheme is to be applied to the boundary between the inter-coded blocks comprises:
selecting a first threshold value from a plurality of candidate first threshold values according to a first index value; and
determining which deblocking filtering scheme is to be used by comparing a difference between the third and first samples with the first threshold value and comparing a difference between the sixth and fourth sample with the first threshold value; and
determining which deblocking filtering scheme is to be applied to the boundary between the two adjacent blocks including at least one intra-coded block comprises:
selecting a second threshold value from a plurality of candidate second threshold values according to a second index value; and
determining which deblocking filtering scheme is used by comparing a difference between the third and first samples with the second threshold value and comparing a difference between the sixth and fourth sample with the second threshold value.

10. The deblocking filtering method of claim 9,
wherein the second threshold value is not greater than the first threshold value when the second index value is equal to the first index value.

11. A deblocking filter, comprising:
a deblocking filtering circuit; and
a control circuit, coupled to the deblocking filtering circuit, for checking if at least one of two adjacent blocks is an intra-coded block and accordingly generating a checking result, and controlling the deblocking filtering circuit to apply a deblocking filtering scheme with a clipping range to the two adjacent blocks as long as the checking result indicates that at least one of the two adjacent blocks is the intra-coded block;
when two adjacent blocks are both inter-coded blocks and a boundary between the inter-coded blocks is determined to be filtered, utilizing a control circuit for determining which deblocking filtering scheme is to be applied to the boundary between the inter-coded blocks by referring to a first threshold setting; and
when at least one of the two adjacent blocks is an intra-coded block and a boundary between the two adjacent blocks including at least one intra-coded block is determined to be filtered, utilizing the control circuit for determining which deblocking filtering scheme is to be applied to the boundary between the two adjacent blocks including at least one intra-coded block by referring to a second threshold setting, wherein the second threshold setting is different from the first threshold setting;
wherein one of the two adjacent blocks includes a first sample, a second sample adjacent to the first sample, and a third sample adjacent to the second sample, and the other of the two adjacent blocks includes a fourth sample adjacent to the first sample, a fifth sample adjacent to the fourth sample, and a sixth sample adjacent to the fifth sample;
determining which deblocking filtering scheme is to be applied to the boundary between the inter-coded blocks comprises:
selecting a first threshold value from a plurality of candidate first threshold values according to a first index value; and
determining which deblocking filtering scheme is to be used by comparing a difference between the third and first samples with the first threshold value and comparing a difference between the sixth and fourth sample with the first threshold value; and
determining which deblocking filtering scheme is to be applied to the boundary between the two adjacent blocks including at least one intra-coded block comprises:
selecting a second threshold value from a plurality of candidate second threshold values according to a second index value; and
determining which deblocking filtering scheme is used by comparing a difference between the third and first samples with the second threshold value and comparing a difference between the sixth and fourth sample with the second threshold value.

12. A deblocking filter, comprising:
a deblocking filtering circuit; and
a control circuit, coupled to the deblocking filtering circuit, for checking two adjacent blocks and accordingly generating a checking result, wherein when the checking result indicates that the two adjacent blocks are both inter-coded blocks, the control circuit utilizes a first threshold setting to determine whether to control the deblocking filtering circuit to filter a boundary between the inter-coded blocks, and when the checking result indicates that at least one of the two adjacent blocks is the intra-coded block, the control circuit utilizes a second threshold setting to determine whether to control the deblocking filtering circuit to filter a boundary between the two adjacent blocks including at least one intra-coded block, wherein the second threshold setting is different from the first threshold setting;
wherein one of the two adjacent blocks includes a first sample and a second sample adjacent to the first sample, and the other of the two adjacent blocks includes a third sample adjacent to the first sample and a fourth sample adjacent to the third sample;
determining whether to control the deblocking filtering circuit to filter the boundary between the inter-coded blocks comprises:
selecting a first threshold value from a plurality of candidate first threshold values according to a first index value;
selecting a second threshold value from a plurality of candidate second threshold values according to a second index value; and determining whether to filter the boundary between the inter-coded blocks by comparing a difference between the first and third samples with the first threshold value, comparing a difference between the second and first samples with the second threshold value, and comparing a difference between the fourth and third samples with the second threshold value; and determining whether to filter the boundary between the two adjacent blocks including at least one intra-coded block comprises:

selecting a third threshold value from a plurality of candidate third threshold values according to a third index value;

selecting a fourth threshold value from a plurality of candidate fourth threshold values according to a fourth index value; and determining whether to filter the boundary between the two adjacent blocks including at least one intra-coded block by comparing a difference between the first and third samples with the third threshold value, comparing a difference between the second and first samples with the fourth threshold value, and comparing a difference between the fourth and third samples with the fourth threshold value.

13. A deblocking filter, comprising:

a deblocking filtering circuit; and a control circuit, coupled to the a deblocking filtering circuit, for checking two adjacent blocks and accordingly generating a checking result, wherein when the checking result indicates that the two adjacent blocks are both inter-coded blocks and a boundary between the inter-coded blocks is determined to be filtered, the control circuit utilizes a first threshold setting to determine which deblocking filtering scheme is to be applied to the boundary between the inter-coded blocks that is to be filtered by the deblocking filtering circuit, and when the checking result indicates that at least one of the two adjacent blocks is an intra-coded block and a boundary between the two adjacent blocks including at least one intra-coded block is determined to be filtered, the control circuit utilizes a second threshold setting to determine which deblocking filtering scheme is to be applied to the boundary between the two adjacent blocks including at least one intra-coded block that is to be filtered by the deblocking filtering circuit, wherein the second threshold setting is different from the first threshold setting;

wherein one of the two adjacent blocks includes a first sample, a second sample adjacent to the first sample, and a third sample adjacent to the second sample, and the other of the two adjacent blocks includes a fourth sample adjacent to the first sample, a fifth sample adjacent to the fourth sample, and a sixth sample adjacent to the fifth sample; determining which deblocking filtering scheme is to be applied to the boundary between the inter-coded blocks comprises:

selecting a first threshold value from a plurality of candidate first threshold values according to a first index value; and determining which deblocking filtering scheme is to be used by comparing a difference between the third and first samples with the first threshold value and comparing a difference between the sixth and fourth sample with the first threshold value; and determining which deblocking filtering scheme is to be applied to the boundary between the two adjacent blocks including at least one intra-coded block comprises:

selecting a second threshold value from a plurality of candidate second threshold values according to a second index value; and determining which deblocking filtering scheme is used by comparing a difference between the third and first samples with the second threshold value and comparing a difference between the sixth and fourth sample with the second threshold value.

* * * * *